3,165,028
SCARFING TOOL
Kenneth R. Keska, Bay Village, Ohio, assignor to The Yoder Company, Cleveland, Ohio, a corporation of Ohio
Filed Mar. 30, 1961, Ser. No. 99,392
13 Claims. (Cl. 90—24)

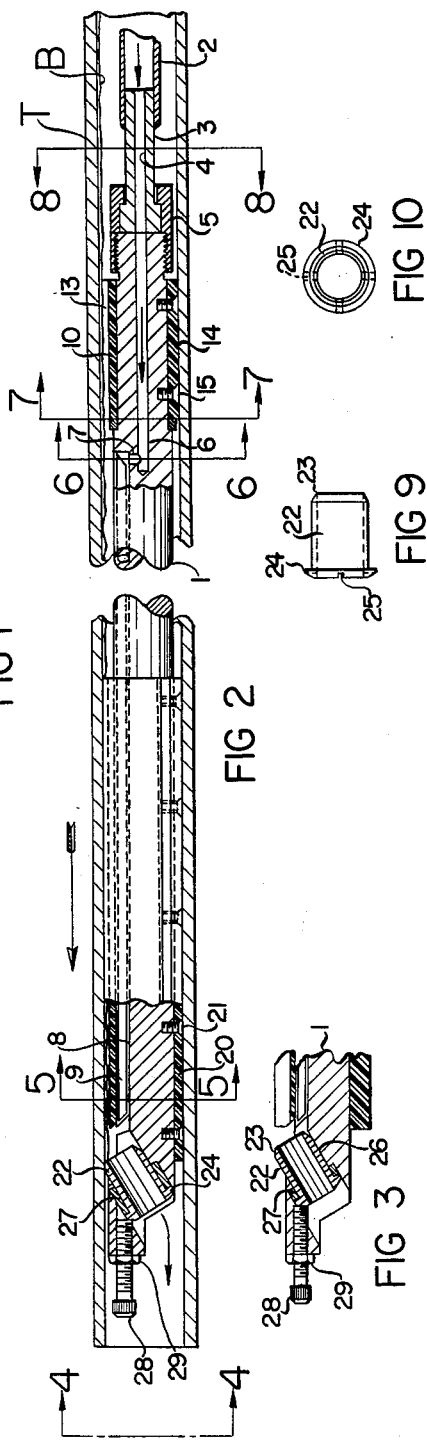

This inevntion relates as indicated to a novel scarfing tool, and more particularly to a tool especially adapted for the trimming and removal of the internal bead normally produced along the seam of electrically welded tubing.

Internal bead removal may be a problem in all sizes of electrically welded pipe but poses an especial problem in the case of relatively small tube diameters in the range of from about 1″ to 4″ diameter, for example. Such tubing may be employed as conduit for electric wiring, in which case the specifications are quite strict regarding removal of the internal bead which may sometimes be jagged and sharp and therefore capable of cutting into the electrical insulation. Even when the tubing is to be employed for the transmission of fluids, it is desirable to remove the bead to avoid causing turbulence in the flow and the lodging and accumulation of dirt or other foreign matter. In the case of large diameter pipe or tubing, the practical solution of the problem is not so difficult inasmuch as a mandrel may be inserted within the tube extending to a point shortly beyond the welding station and there provided with a carriage having a cutting tool adapted to engage and remove the weld bead, such tool being supported by appropriate rollers bearing against the opposite wall of the tube (see, for example, Crawford Patent 2,687,464).

Devices of this nature have not proved equally satisfactory in the case of small diameter tubing for several reasons. The rollers supporting the cutting or trimming tool must then, of course, be of very small diameter with even smaller bearings and at the high rate of tube travel attained in modern tube mills, these rollers are forced to rotate to excessive speeds, resulting in frequent failure. In some mills, it is customary to stop the operation and replace the carriage and cutting tool every four hours. In such small diameter tubes, there is also a problem in disposing of the trimmed flash, especially when the latter forms a long curling strip instead of breaking up into small chips. Such trimmed flash may jam the cutting tool or carriage within the tube, causing the same to break loose from the supporting mandrel and to be carried into the usual flying shear at a subsequent cut-off station. Damage to the shear may result and in any case it is necessary to make a search through the stack of cut-off lengths of tubing to locate the section containing the carriage and cutting tool, and also to scrap those cut-off lengths of tubing from which the internal bead was not removed.

It is accordingly an important object of my invention to provide a new and improved scarfing tool for the removal of the internal bead of electrically welded tubing which will permit the mill to be operated at full rated speed without quickly wearing out the tool support means.

Another object is to provide such tool, the support portion whereof is particularly adapted for employment in tubes of relatively small diameters although also suitable for use in larger diameter pipe and tubing.

Still another object is to provide such tool which may be employed for long periods of time without replacement and which is adapted for very quick and simple adjustment, both to provide a fresh cutting edge and to regulate the depth of cut.

A further object is to provide such tool having no moving parts.

A still further object is to provide such tool which will avoid scratching or otherwise marring the interior surface of the tube.

Yet another object is to provide a cooling system for such tool separated from the spent liquid derived from the welding zone cooling system.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a top plan view of a new scarfing tool embodying the principles of the present invention;

FIG. 2 is a side elevational view of the tool of FIG. 1 broken away in longitudinal section in certain regions better to disclose the internal construction thereof;

FIG. 3 is a fragmentary longitudinal section showing adjustment of the cutting tool proper;

FIG. 4 is an end elevational view of the new scarfing tool viewed from the left or "downstream" end as seen in FIGS. 1 and 2;

FIG. 5 is a transverse section taken on the line 5—5 on FIG. 2;

FIG. 6 is a transverse section taken on the line 6—6 on FIG. 2;

FIG. 7 is a transverse section taken on the line 7—7 on FIG. 2;

FIG. 8 is a transverse section taken on the line 8—8 on FIG. 2;

FIG. 9 is a side elevational view of the cutting tool per se adapted to be mounted in an appropriate support as shown in FIGS. 1, 2 and 3 for employment in accordance with the invention; and FIG. 10 is an end view of the cutting tool of FIG. 9 viewed from the right-hand or cutting end thereof.

Now referring more particularly to said drawing, the embodiment of the invention there illustrated comprises a rigid elongated metal bar or body member 1 of steel or brass, for example, adapted to be inserted with in the welded tubing T having an inwardly projecting weld bead B produced at a preceding welding station. Pipe or tubing of this nature is ordinarily produced on a tube mill such as the well-known Yoder mill wherein a flat strip of stock is progressively roll formed to general cylindrical shape having somewhat spaced apart seam edges which are then brought together at the welding station and there electrically welded either through employment of a pair of rotary electrodes or through the application of induced current flow across the contacting edges, for example. The tubing thus formed advances continuously (from right to left as shown in FIG. 2) onto a run-out table where it may be severed into desired lengths by means of the usual flying shear. Tubing such as steel and aluminum tubing is thus continuously produced in large quantity at high rates of speed of several hundred feet per minute and in producing the higher grades of tubing, the internal weld bead B must be removed by means of an appropriate scarfing tool introduced into the tubing and maintained stationary at a position intermediate the weld station and the cut-off station so that the cutting tool carried thereby is effective continuously to remove such bead from the traveling work. The scarfing tool is thus maintained in longitudinal position by means of a mandrel 2 which in the form illustrated is tubular and welded to an elongated keyed adapter 3 having an inner passage 4 extending longitudinally therethrough. Such tubular mandrel will extend past the welding station and out through the open seam in the formed blank to appropriate anchoring means in conventional well-known manner.

The adapter 3 is secured to the upstream end of body member 1 by means of adapter nut 5 threaded on the latter. Such body member is drilled at 6 to provide an inner passage co-axial with passage 4 and communicating therewith and is also drilled at 7 to connect such passage 6 with a longitudinally extending groove 8 in body member 1 into which tube 9 is fitted. Fluid introduced through tubular mandrel 2 may accordingly be caused to flow the length of body member 1 separately from and independently of any fluid which may be contained within welded tube T derived from prior operations, and more particularly coolant from the welding station.

A nylon sleeve 10 is secured to body member 1 adjacent adapter nut 5 by means of screws such as 11 and 12, such sleeve having a longitudinal groove 13 in its upper outer surface to receive weld bead B and permit free passage of the latter without scraping. In the embodiment illustrated, such sleeve does not entirely encircle body member 1 (see FIG. 7) and a further longitudinally extending nylon rib 14 is affixed to the underside of body member 1 by means of screws such as 15, as shown. Such sleeve and rib together will define an outer circular periphery adapted closely but slidingly to fit within the interior of the particular tube to be deburred.

A second nylon sleeve 16 longitudinally spaced from such first sleeve 10 will similarly be secured to body member 1 by means of screws such as 17 and 18 and is provided with an upper longitudinally extending groove 19 in its upper surface aligned with groove 13 similarly to receive weld bead B and permit passage of the latter without scraping. In the same manner, a nylon rib 20 is secured as by means of screws 21 to the underside of body member 1, the outer peripheries of sleeve 16 and rib 21 conforming to and slidably fitting the inner surface of tube T. These two sets of sleeves and ribs, being substantially longitudinally spaced from one another on body member 1 serve firmly to support the latter within the tube against deflection from forces imposed thereon in use. As will be apparent particularly from an inspection of FIG. 6 of the drawing, the spaces on each side of ribs 14 and 20 permit flow of excess fluid from the welding station past the scarfing tool support and separate from the flow of coolant or other fluid through mandrel 2 and the body of the scarfing tool support. The tube 9 may be of copper and brazed in position if desired.

The cutting tool 22 is preferably of hollow cylindrical shape having one end ground to a beveled circumferential cutting edge 23 defined by the inner wall of such cylinder. The other end of such cutting tool has a radially outwardly projecting peripheral shoulder 24 with its end surface toward the cutting edge 23 being normal to the outer cylindrical surface of the tool and its other end surface being outwardly beveled, preferably at an angle of 60° to the axis of the tool for a reason made clear below. A plurality of radial grooves such as 25 are cut in such beveled end of the tool. The cutting tool will ordinarily be made of tool steel hardened and ground. When the outer end of shoulder 24 is ground at a 60° angle as indicated above, then the cutting edge 23 may be ground at a 30° angle relative to the axis of the cutting tool and the tool mounted in the downstream end portion of body member 1 as shown in FIGS. 1-3 inclusive. Such tool is received within an inclined bore 26 in such body member 1 with the cutting edge directed in an upstream direction in position to engage and remove the bead B as the welded tubing is continuously advanced therepast. A shim in the form of a sleeve or bushing 27 is interposed between shoulder 24 and a shoulder formed in body member 1 adjustably to determine the position of the cutting tool longitudinally of its axis. Thus, as shown in FIG. 3, the scarfing tool of this invention may be adjusted for use within tubing of increased diameter by employing a shorter shim 27 and thicker nylon bushings or spacers such as 10 and 16 engaging the inner surface of the tubing. When the cutting edge of the tool requires regrinding, two increments should be removed from the length of shim 27 for every increment of length removed from cutting tool 22. A cap screw 28 threaded into the rearmost portion of body member 1 is adapted to bear against the beveled surface of flange 24 of cutting tool 22 to hold the latter firmly in adjusted position, a hex nut 29 locking such screw.

The cutting tool may be rotated to a different adjusted position to present a new portion of its cutting edge for engagement with the weld bead by backing off the cap screw 28 a fraction of a turn and engaging a screw driver in one of the grooves 25 whereupon the tool may be manually turned about its axis. For regrinding, several turns of the cap screw will permit both the cutting tool and shim 27 to slide out the bottom of the tool body. The end portion of body 1 mounting the cutting tool cantilevered downstream of the nylon anti-friction guide means is of somewhat larger diameter than the remainder of such body (see FIG. 4) and provided with a flat underside even with the cylindrical continuation of such body. Other wear-resistant materials such as "Micarta" and "Teflon," for example, may be utilized instead of nylon for the spacer sleeves and ribs. It will be appreciated that the term "sleeve" as applied to such elements is not intended to imply that they must necessarily completely encircle the body of the support, and various equivalent shapes and arrangements may be employed.

The shape of the cutting edge is well accommodated to the inner curved surface of the tube being trimmed and the flow of coolant from passage 9 not only serves to cool the cutting edge but also to assist in flushing the chips or flash through the hollow cylindrical cutting tool for disposition without possibility of clogging or jamming the tool.

It will be seen that the objects of the invention have been accomplished in a manner to afford long continuous operation with a minimum of maintenance and without danger of marring the tubing to be deburred.

Other modes of applying the principle of the invention may be employed, change being made as regards the details described, provided the features stated in any of the following claims or the equivalent of such be employed.

I therefore particularly point out and distinctly claim as my invention:

1. A hollow cylindrical cutting tool having one end ground to a beveled circumferential cutting edge defined by the inner wall of such cylinder, the other end of said tool having a radially outwardly projecting peripheral shoulder with its end surface toward such cutting edge of the tool being normal to the outer cylindrical surface of the tool and its other end surface being outwardly beveled.

2. The tool of claim 1, wherein such other end of said tool is provided with a plurality of radial grooves therein.

3. In a scarfing tool adapted to remove the inner weld bead from welded tubing, a support, a hollow cylindrical cutting tool carried by said support and positioned to engage and remove such bead with the removed material escaping through such hollow cylinder, and conduit means associated with said support leading to said cutting tool to deliver fluid thereto with such fluid likewise escaping through such hollow cylinder.

4. The combination of claim 3 further including a tubular mandrel, tubular connecting means removably connecting said mandrel to said support, said fluid being directed through said tubular mandrel, and said tubular connecting means to said conduit means.

5. The combination of claim 4 wherein said conduit means comprises an elongated tube positioned in a longitudinally extending groove in said support, one end of said tube terminating adjacent the cutting end of said cutting tool thereby directing fluid against said cutting end for cooling the same.

6. The combination of claim 3 further including stationary anti-friction guide means on said support adapted to engage circumferential regions of the inner surface of said tubing thereby definitely to position said support relative thereto.

7. The combination of claim 6 wherein said guide means is of synthetic plastic.

8. The combination of claim 6 wherein said guide means is of nylon.

9. The combination of claim 6 wherein said guide means comprises longitudinally spaced synthetic plastic sleeves.

10. A scarfing tool comprising an elongated support and a cylindrical cutting tool mounted on said support adjacent one end thereof and inclined longitudinally of said support, the circular end of said cutting tool disposed generally toward the body of said support being ground to provide a cutting edge, a sleeve engaging said support and telescopically positioned around said cutting tool, the bottom end of said sleeve abutting a shoulder on said cutting tool thereby to regulate the extent of projection of said cutting edge, and locking means releasably securing said cutting tool in its longitudinally adjusted position against axial retraction.

11. The scarfing tool of claim 10, in which said cutting tool is mounted for rotative adjustment about its axis.

12. In a scarfing tool adapted to remove the inner weld bead from welded tubing, a support, a hollow cylindrical cutting tool carried by said support and positioned to engage and remove such bead with the removed material escaping through such hollow cylinder, said cutting tool having one end ground to a bevelled circumferential cutting edge defined by the inner wall of such cylinder, the other end of said cutting tool having a radially outwardly projecting peripheral shoulder with its end surface toward such cutting edge of the cutting tool being normal to the outer cylindrical surface of the cutting tool and its other end surface being outwardly bevelled, and conduit means associated with said support leading to said cutting tool to deliver fluid thereto with such fluid likewise escaping through such hollow cylinder.

13. The method of scarfing a weld bead from the inner surface of welded tubing which comprises continuously advancing such tubing relative to a stationary internal cutting tool of cylindrical form, said cutting tool engaging and removing said bead from said tubing, simultaneously flowing coolant against and through such cylindrical tool to contact directly the cutting surface of the cutting tool and bead to thus cool the tool and assist in flushing the removed bead through the interior of the cylindrical tool.

References Cited in the file of this patent

UNITED STATES PATENTS

| | | |
|---|---|---|
| 1,449,513 | Jaeger | Mar. 27, 1923 |
| 1,631,641 | Montstream | June 7, 1927 |
| 2,053,831 | Jenkins | Sept. 8, 1936 |
| 2,411,985 | Cahen | Dec. 3, 1946 |
| 2,423,468 | Ridder | July 8, 1947 |
| 2,645,164 | Ofenstein et al. | July 14, 1953 |

FOREIGN PATENTS

| | | |
|---|---|---|
| 607,770 | Great Britain | Sept. 6, 1948 |
| 210,983 | Australia | Oct. 24, 1957 |